United States Patent
Egger et al.

(10) Patent No.: US 6,780,234 B2
(45) Date of Patent: Aug. 24, 2004

(54) PIGMENT GRANULATES FOR COLORING BUILDING MATERIALS

(75) Inventors: Christian Egger, Pralormo (IT); Klaus Nungess, Neu-Isenburg (DE); Adolf Veit, Wiesbaden (DE); Stefan Vogler, Walluf (DE)

(73) Assignee: Brockhues GmbH & Co KG, Walluf (DE)

( * ) Notice: Subject to any disclaimer, the term of this patent is extended or adjusted under 35 U.S.C. 154(b) by 0 days.

(21) Appl. No.: 10/727,219

(22) Filed: Dec. 2, 2003

(65) Prior Publication Data

US 2004/0112254 A1 Jun. 17, 2004

Related U.S. Application Data

(63) Continuation of application No. 09/914,991, filed as application No. PCT/EP01/00709 on Jan. 23, 2001, now Pat. No. 6,706,110.

(30) Foreign Application Priority Data

Jan. 26, 2000 (DE) ......................................... 100 03 248

(51) Int. Cl.[7] ................................................. C09C 1/22
(52) U.S. Cl. ...................... 106/460; 106/502; 106/472; 106/476; 106/499

(58) Field of Search ................................. 106/460, 472, 106/476, 499, 502

(56) References Cited

U.S. PATENT DOCUMENTS

| | | | | |
|---|---|---|---|---|
| 4,230,501 A | * | 10/1980 | Howard et al. | 106/502 |
| 5,389,137 A | * | 2/1995 | Linde et al. | 106/281.1 |
| 5,882,395 A | | 3/1999 | Linde et al. | |
| 5,961,710 A | | 10/1999 | Linde et al. | |
| 6,706,110 B2 | * | 3/2004 | Egger et al. | 106/460 |

FOREIGN PATENT DOCUMENTS

| WO | WO 97/20892 | 6/1997 |
|---|---|---|
| WO | WO 01/53228 A1 | 7/2001 |
| WO | WO 01/55264 A2 | 8/2001 |

* cited by examiner

Primary Examiner—C. Melissa Koslow
Assistant Examiner—Shalie Manlove
(74) Attorney, Agent, or Firm—McAndrews, Held & Malloy, Ltd; Donald J. Pochopien

(57) ABSTRACT

The invention pertains to pigment granulates for the coloring of asphalt, bitumen, bituminous materials, tar, and plastics as well as processes to manufacture such granulates. The mixture to be granulated comprises a mixture containing one or more pigments, at least one agent to promote the coloring and distribution in homopolar media and/or at least one dispersant for polar system as well as one or more solvents if necessary.

19 Claims, No Drawings

PIGMENT GRANULATES FOR COLORING BUILDING MATERIALS

This application is a continuation of U.S. Ser. No. 09/914,991, filed Jan. 28, 2002, now U.S. Pat. No. 6,706,110 which is a Section 371 of PCT/EP01/00709, filed Jan. 23, 2001, now pending, which claims priority from German Patent Application 100 03 248.6, filed Jan. 26, 2000.

The invention pertains to pigment granulate for the coloring of homopolar media, like asphalt, bitumen, bituminous materials, tar, and plastics, and processes for the manufacture of such granulates.

At present, in addition to organic pigments, inorganic pigments, especially those based on different iron oxides, are also used to color homopolar materials, especially asphalt and plastics. Compared to powders and pastes, pigment granulates exhibit very considerable advantages in this regard, for example in their handling, their prevention of dust and the like, but also in regard to their dispersing properties.

The use of aqueous carbon preparations (containing 30 to 80% water) as pearl granulates for coloring in the cement industry is known from DE-A1 29 08 202. This process cannot be applied to other pigments, and granulates with such water contents are fundamentally disadvantageous, also for applications involving asphalt and plastics.

The granulation of pigments together with binders through spray granulation is known from DE-A1 29 40 156. Pigment granulates produced in this way are used to manufacture inks, to color plastics, lacquers, and the like. There is no connection to the coloring of building materials, asphalt, and the like.

Color granulates for building materials containing more than 5 to 50% by weight of water are known from EP-A2 0 191 278.

EP-A1 0 567 882 describes pelletized, compacted, and sprayed granulates containing binders, such as especially machine oil, wax, paraffin, and the like, which are to be used to color asphalt, among other things. In addition to the binders, substances like lignin sulfonate, molasses, starch, and the like can be used. According to this disclosure, substances like lignin sulfonate alone cannot be used as binders.

In the context of this description, "granulates" means every material whose mean grain size in comparison to the original material is increased by a treatment stage. Therefore, "granulates" means not only spray granulates and compacting granulates but, for example, also products of a moist treatment with subsequent pulverizing.

On account of their considerable advantages, in comparison to powders, pastes, and the like, granulates have been used for decades on a large scale industrially. Granulation has been accepted for a long time for the processing of pigments as well.

Experience acquired with pigment granulates in other areas cannot simply be transferred to the coloring of building materials, asphalt, and the like. In practice, granulates, which theoretically should be almost perfectly suitable, often prove inadequate because they do not combine all of the required properties.

Although often an excellent solidity of the granulate is achieved, which counteracts its destruction during packaging and transport and restricts the production of dust, on the other hand, its dispersability can be impaired, resulting in the desired homogeneous coloring and the required color intensity not being achieved.

On the other hand, granulates with excellent color intensity and easy dispersability are often too soft and already disintegrate before they are worked into the asphalt or plastic, which can result in increased dust production, in residues in the packaging, in reduced flowability and in corresponding frequent incorrect dosages.

Of the various methods of granulation, spray granulation has become generally accepted in practice, while, for example, fluidized bed granulations, which is fully comparable theoretically, has not yet produced any usable granulates.

Proposals have recently become known to forego granulates completely and, instead, to use coated powders. WO 97/20892 is given as an example. It remains to be seen whether in this way broad particle size distributions due to clumping can be avoided and whether such coated powders can be used without producing the dust problems typical of the prior art before pigment granulates were introduced.

In order to promote the dispersion and distribution of pigment granulates, wetting and binding agents are used which are chosen in such a way that the granulate disintegrates with the desired dispersing effect. For the coloring of homopolar media, such as especially asphalt and plastics, hydrophobic compounds, like oils and waxes, which guarantee an adequate dispersability of the granulates in the hydrophobic application medium, are traditionally used as binders for the mixture to be granulated. The disadvantages of mixtures to be granulated which are based on homopolar solvents are, first, the high costs in comparison to a mixture based on water, for example, and, second, the fact that special technical devices and security measures are required for the evaporating organic binders, like oils and waxes where granulates are spray dried.

Water-based wetting agent and binder mixtures, for which water-soluble wetting agents and binders, like lignin sulfonate and the like, exhibit the disadvantage, however, the pigment cannot be homogeneously distributed in a homopolar application medium, like asphalt, bitumen, or plastic. This result in an uneven coloring, which is undesirable.

Therefore, an essential objective of the invention is to propose, against this background, a process for the coloring of homopolar media, like asphalt, bitumen, bituminous materials, tar, and plastics, by means of pigment granulates which promotes the coloring by the pigments and at the same time improves the dispersion of the pigment in a homopolar application medium. Another objective of the invention is to present a process which promotes the sprayability of the granulate.

The features defined in the independent claims achieve this objective.

Advantageous developments are described in the dependent claims.

The objective of the invention is solved by the pigments, in particular iron oxides and/or soot pigments, and the traditional wetting and binding agents, also being mixed during the manufacture of the pigment granulates with at least one agent which promotes the coloring and the distribution of the pigment in a homopolar media and/or at least one dispersing agent for polar systems. Surprisingly, it was found that the agents to promote the coloring and the distribution of the pigment in a homopolar media in accordance with this invention act in such a way that a lipophilic coating is produced on the granulate as a result of which the dispersion and, therefore, the homogeneous distribution of the pigment in the homopolar media, like asphalt, bitumen, bituminous materials, tar, and plastics, is promoted and, consequently, also the coloring of the homopolar media is promoted in an above-average manner.

Such an agent which promotes the coloring and the distribution of the pigment and which can be used to manufacture the inventive pigment granulate is preferably a wax or a mixture of several waxes. When using waxes, attention must be paid to the wax having both a high scratch and abrasion resistance. In a preferred embodiment of the invention, waxes with these properties have a melting point in the 50° C. to 200° C. range, preferably 50° C. to 130° C.

It is irrelevant with this invention whether the waxes are natural or synthetic in origin. Preferably, however., synthetic waxes are used, like polyalkylene waxes, especially polyethylene waxes, polyethylene glycol waxes, paraffin waxes, styrene acrylate waxes, polytetrafluoroethylene waxes, and the like.

With this invention, non-ionogenic waxes, waxes with anionic ionogenity, waxes with cationic ionogenity and combinations of these waxes are used. Preferably, wax mixtures are used, in which case both mixtures of waxes with anionic and/or cationic ionogenity or mixtures of non-ionogenic waxes as well as mixtures of non-ionogenic waxes and waxes with anionic or cationic ionogenity can be used. Especially preferred, mixtures of polyethylene wax and styrene-acrylate wax or mixtures of polyethylene wax and paraffin wax can be used.

In order to increase the solid contents, especially of the pigment contents, in the mixture to be granulated, in accordance with the invention, dispersing agents or dispersants for polar systems can be used which promote the liquefication of solid pigment after polar solvents are added, such as water in particular, and the shaping of the granulates, especially with spray drying. The latter is especially advantageous if the aforesaid agents which promote the coloring and the distribution of the pigment in homopolar media are contained in the mixture to be granulated. With this preferred embodiment, a synergistic effect results due to the fact that both the pigment contents in the mixture to be granulated and the shaping of the granulates are increased as well as the homogeneity of the coloring in the homopolar medium. The dispersants can also be used advantageously, however, if none of the agents which promote coloring and distribution of the pigment in a homopolar media are used because, for example, with spray drying the increase in the pigment fraction in the pigment slurry to be sprayed results in the spray costs being reduced substantially. As well, the agents which promote the coloring and the distribution of the pigment in the homopolar media can also be used advantageously if the dispersants for polar systems are not used.

Dispersants within the scope of this invention are defined, as in the Römpp Chemie Lexikon [Römpp Chemistry Lexicon], Georg Thieme Verlag [Georg Thieme Publishers], Stuttgart, N.Y., ninth edition, 1990, page 1010, as agents which facilitate the dispersing of particles in a solvent by lowering the surface tension between the two components.

With this invention the dispersants for polar systems in the mixture to be granulated can be chosen from hydrophilic and amphoteric, ionogenic, and non-ionogenic compounds. Preferably, these agents can be chosen from mono- or polyhydroxy compounds, mono- or polyhydroxy amine compounds, (poly)carboxylates, polyacrylates, lignin sulfonates, sulfated polyglycol ethers, melamine formaldehyde condensates, naphthalene formaldehyde condensates, alkyl-, aryl, or alkylaryl sulfonates, polyglycols, polyglycol derivatives, PVP, polyethers, phosphates, silicates, aluminates, borates, cellulose derivatives, or combinations of these compounds.

Monohydroxy compounds include monovalent, primary, secondary, or tertiary, alkyl-substituted or non-substituted alcohols, such as, for example, 1-propanol, 2-methyl-1-propanol, 2-methyl-2-propanol, and the like. Alcohols from $C_3$ up are preferred. The polyhydroxy compounds used in accordance with the invention include polyhydric alkyl-substituted or non-substituted alcohols, for example diols, glycols, like ethylene glycol and polyalkylene glycol, glycerine, sugar alcohols, like sorbitol and ionositol, trimethylol propane, and the like. Preferably, 2-methyl-1-propanol and glycols are used in the case of this invention.

The monohydroxyamino compounds used as dispersants include monovalent, primary, secondary, or tertiary, alkyl-substituted or non-substituted amino alcohols, such as 2-amino-1-propanol, 2-amino-1-butanol, 3-amino-1-propanol, 2-amino-2-methyl-1-propanol, and the like. Amino alcohols from $C_3$ up are preferred. Polyhydric alkyl-substituted or non-substituted alcohols, such as, for example, 2-amino-2-methyl-1,3-dihydroxy propane, and the like can be used as inventive polyhydroxy amine compounds. In a preferred embodiment of this invention, 2-amino-2-methyl-1-propanol is used.

Other compounds with relatively low molecular weights (preferably $C_1$ to $C_{100}$, more preferably $C_2$ to $C_{50}$, most preferably $C_3$ to $C_{25}$), which carry one or more hydrophilic groups, can also be used. These can be $NH_2$ and OH, but also ether groups, carboxylic groups, acid functions, and the like, if necessary also in neutralized (salt) form.

The total quantity of the agents to promote the coloring and the distribution of the pigment in homopolar media used in the inventive process for the manufacture of pigment granulates is at least 0.01 percent by weight, preferably 0.01 to 5 percent by weight, and especially preferred 0.4 to 3.5 percent by weight, based on the total quantity (weight) of the mixture to be granulated.

The total quantity (weight) of the dispersants for polar systems used in the inventive process for the manufacture of pigment granulates is at least 0.05 percent by weight, preferably 0.1 to 3 percent by weight, and especially preferred 0.25 to 1.7 percent by weight, based on the total weight of the mixture to be granulated.

In accordance with the invention, the pigments can be mixed as a powder mixture or suspended in a solvent with at least one agent to promote the coloring and the distribution in homopolar media and/or at least one dispersant for polar systems. The resulting mixtures can be produced through compression, compacting, pressing, or briquetting, spraying, fluidized bed drying, or through pelletizing, or combinations of the aforesaid processes. Preferably, spray processes (e.g., spraying or fluidized bed drying)are used.

The use of granulates during mixing with homopolar media, like asphalt, bitumen, bituminous materials, tar, and plastics, corresponds to the customary, known procedures.

The following four examples are intended to explain embodiments of the invention. Four pigment granulates suitable for the inventive process for the coloring of homopolar media, especially asphalt and plastics, were manufactured in accordance with the recipes presented in the following tables:

| Substance | Percent by weight |
|---|---|
| Pigment granulate mixture 1 | |
| Fresh water | 34.66 |
| Polyacrylate | 1.15 |

-continued

| Substance | Percent by weight |
|---|---|
| 2-amino-2-methyl-1-propanol | 0.25 |
| Iron oxide red | 62.50 |
| Sodium hydroxide solution (20%) | 0.20 |
| Wükonil ™ LP 50 | 0.83 |
| Südranol ™ 340 | 0.31 |
| Wükonil ™ MS 30 | 0.10 |
| Pigment granulate mixture 2 | |
| Fresh water | 35.31 |
| Lignin sulfonate | 0.5 |
| 2-amino-2-methyl-1-propanol | 0.25 |
| Iron oxide red | 62.50 |
| Sodium hydroxide solution (20%) | 0.20 |
| Ultralube ™ E 340 | 0.83 |
| Ultralube ™ MD 2000 | 0.41 |
| Pigment granulate mixture 3 | |
| Fresh water | 32.5 |
| Polyethylene propylene glycol | 1.5 |
| 2-amino-2-methyl-1-propanol | 0.25 |
| Iron oxide red | 62.5 |
| Sodium hydroxide solution (20%) | 0.20 |
| Wükonil ™ LP 50 | 1.66 |
| Südranol ™ 340 | 0.89 |
| Wükonil ™ MS 30 | 0.50 |
| Pigment granulate mixture 4 | |
| Fresh water | 33.42 |
| Polyacrylate | 1.15 |
| 2-amino-2-methyl-1-propanol | 0.25 |
| Iron oxide red | 62.50 |
| Sodium hydroxide solution (20%) | 0.20 |
| Ultralube ™ E 340 | 1.66 |
| Ultralube ™ MD 2000 | 0.82 |

The brand names in the above tables represent the following:
Wükonil ™ LP 50: macroparaffin (anionic, melting range: 60° C.)
Südranol ™ 340: polyethylene wax (anionic, melting range: 95° C.)
Wükonil ™ MS 30: styrene-acrylate wax (anionic, melting range: >80° C.)
Ultralube ™ MD 2000: polyethylene wax (non-ionogenic, melting range: 127° C.)
Ultralube ™ E 340: paraffin wax (anionic, melting range: 56° C.–58° C.)

What is claimed is:

1. A pigment granulate suitable for the coloring of a homopolar media selected from the group consisting of asphalt, bitumen, bituminous materials and tar, said granulate comprising one or more pigments, a mixture of waxes to promote the coloring and the distribution of said one or more pigments in homopolar media and a dispersant for polar systems, said waxes in said mixture being at least two waxes selected from the group of a non-ionogenic wax, a wax having anionic ionogenicity, and a wax having cationic ionogenicity.

2. The granulate of claim 1, wherein the mixture of waxes comprises a mixture of two or three waxes.

3. The granulate of claim 1, wherein the waxes in said mixture have melting points in the range of 50° C. to 200° C.

4. The granulate of claim 3, wherein the waxes in said mixture have melting points in the range of 50° C. to 130° C.

5. The granulate of any one of claims 1, 2, 3 or 4 wherein said mixture of waxes comprises a non-ionogenic wax and a wax with anionic ionogenity.

6. The granulate of claim 1, wherein said non-iogenic wax is a polyethylene wax.

7. The granulate of claim 1, wherein said mixture of waxes is a mixture of a polyethylene wax and a styrene-acrylate wax.

8. The granulate of claim 1, wherein said mixture of waxes is a mixture of a polyethylene wax and a paraffin wax.

9. The granulate of claim 1, wherein the total quantity of said waxes ranges from 0.1 to 5 percent by weight based on the total weight of the mixture to be granulated.

10. The granulate of claim 9, wherein the total quantity of said waxes ranges from 0.4 to 3.5 percent by weight based on the total weight of the mixture to be granulated.

11. The granulate of claim 1, wherein the dispersant for polar systems is selected from the group consisting of a mono- or polyhydroxy compound, a mono- or polyhydroxyamino compound, a (poly)carboxylate, polyacrylate, lignin sulfonate, sulfated polyglycol ether, a melamine formaldehyde condensate, a naphthalene formaldehyde condensate, an alkyl-, aryl, or an alkylaryl sulfonate, a polyglycol, a polyglycol derivative, a polyether, a phosphate, a silicate, an aluminate, a borate, a cellulose derivative, and combinations of these compounds.

12. The granulate of claim 1, wherein the monohydroxyamino compound is 2-amino-1-propanol, 2-amino-1-butanol, 3-amino-1-propanol or 2-amino-2-methyl-1-propanol.

13. The granulate of claim 12, wherein the monohydroxyamino compound is 2-amino-2-methyl-1-propanol.

14. The granulate of claim 11, wherein the monohydroxy compound is 1-propanol, 2-methyl-1-propanol or 2-methyl-2-propanol.

15. The granulate of claim 14, wherein the monohydroxy compound is 2-methyl-1-propanol.

16. The granulate of claim 1, wherein the total quantity of the dispersants for polar system ranges from 0.1 to 3 percent by weight based on the total weight of the mixture to be granulated.

17. The granulate of claim 16, wherein the total quantity of the dispersants for polar system ranges from 0.25 to 1.7 percent by weight based on the total weight of the mixture to be granulated.

18. The granulate of claim 1, wherein the pigment is selected from the group consisting of an iron oxide pigment and a soot pigment.

19. The granulate of claim 1, wherein the polar system is water.

* * * * *